Dec. 5, 1944.  A. CORTE  2,364,425
GUN TURRET
Filed Oct. 21, 1940  2 Sheets-Sheet 1
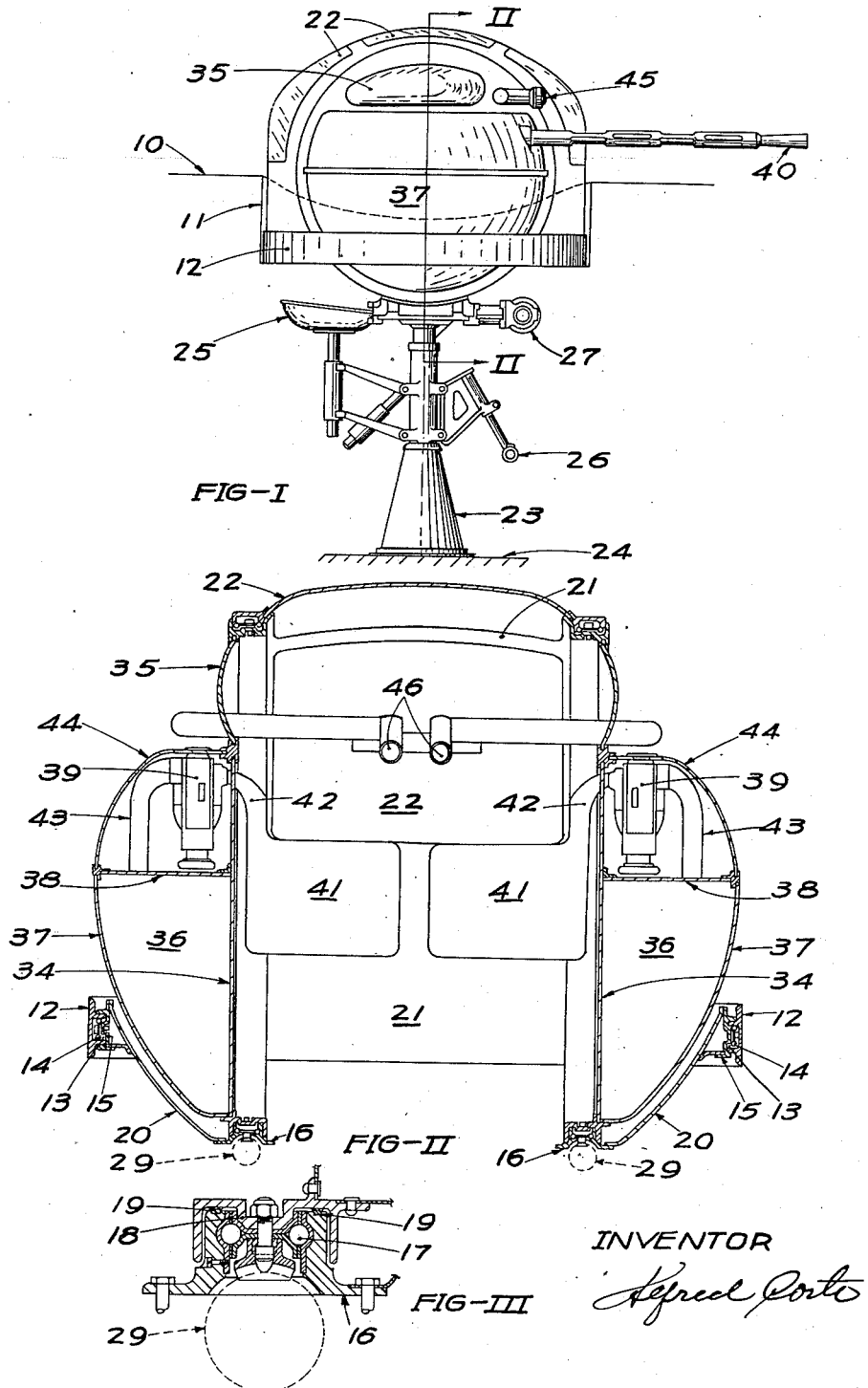
INVENTOR Dec. 5, 1944.    A. CORTE    2,364,425
GUN TURRET
Filed Oct. 21, 1940    2 Sheets-Sheet 2
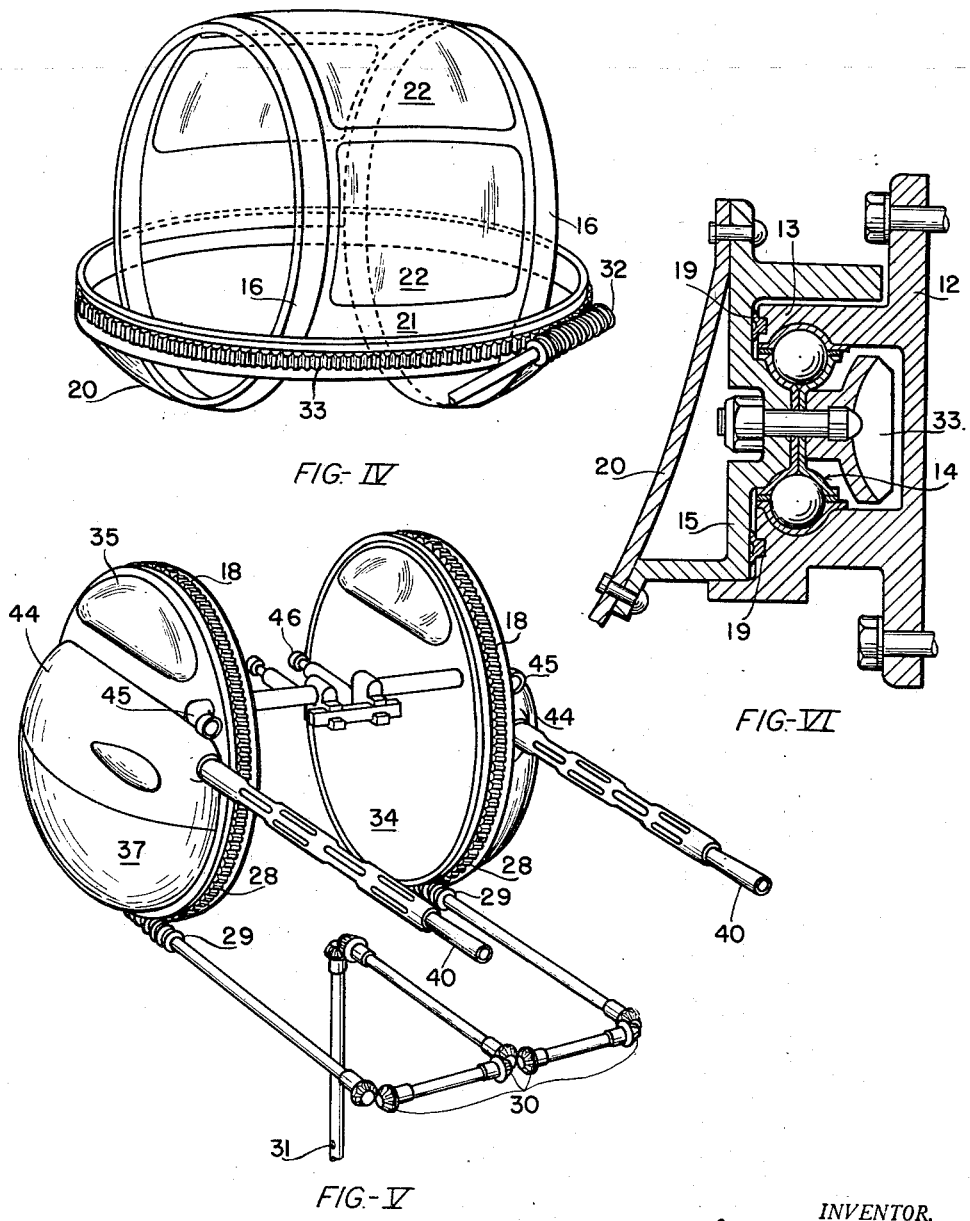
INVENTOR.
ALFRED CORTE
BY
AGENT Patented Dec. 5, 1944

2,364,425

UNITED STATES PATENT OFFICE 2,364,425

GUN TURRET

Alfred Corte, Glendale, Calif., assignor, by mesne assignments, to Lockheed Aircraft Corporation, a corporation of California Application October 21, 1940, Serial No. 362,067

3 Claims. (Cl. 89—37.5)

This invention relates to an improved gun turret for aircraft use, particularly adapted to mount two or more large calibre machine guns and capable of moving in traverse and in elevation as a unit.

Revolving turrets are of course well known in naval practice, but aircraft usages involve a number of unique problems that obviously preclude the ready adaption of naval designs to aircraft purposes. The armored naval turret becomes a transparent enclosure primarily designed to resist wind pressure at high airplane speeds. Such air velocities render the open elevation port, common to naval practice, impractical for aircraft use, because the gunner could not withstand the physical impact of the air stream and also accurately manipulate the turrent and gun controls.

It is accordingly an object of this invention to provide a turrent movable in elevation as well as traverse so that the gunner and operating mechanism can be entirely enclosed and the complete enclosure can be pressurized for high altitude flight should it be so desired. To this end I have provided a central turret cradled for gun elevating movements in a traversable carriage, in effect producing a sphere that can be rotated about axes at right angles to each other to produce any desired direction of motion of the guns, limited only by obstructions of the supporting body; in the case of an airplane turret, the fuselage, wings and empennage. It will be evident that the turrent of this invention is not limited to use on top the fuselage, but can be used in the nose or tail, on the sides or bottom of the fuselage, as may be desired, and that it is particularly adapted to remote control from a central point of observation.

It is another object of this invention to provide a gun turrent that is capable of being rapidly, smoothly, and accurately or sensitively directed to any part of the field of fire; consistent accuracy and a small fire pattern requiring rigidity of structure, while the characteristics of airplane construction require an avoidance of stress concentrations by distributing the load and gun recoil action over a large area of the structure.

It is a further object of this invention to provide a multiple gun turret of the least possible size and projection into the air stream, while providing ample room to permit ready ingress and egress of gunners whose physical proportions may depart considerably from the average. Further, it is desired to provide comfortable accommodations and due freedom of movement to aim and fire throughout the range of movements of the turret.

It is a further object of this invention to provide an improved turret construction wherein two or more guns, to be aimed and fired as a unit, are separated and located near the extremities of a horizontal diameter of the turret in order to provide a more efficient use of the space within the turret, by permitting the gunner to sit between the guns rather than behind them, thus further assisting in the attainment of an extremely compact turret of high firing power. The separation or spacing of the guns also results in the feature that dead spots due to aircraft structure in the line of fire of one gun are still outside the line of fire of the opposite gun or guns, which can therefore remain in action.

It is also an object of this invention to provide a gun turrent of the class described wherein the traverse and elevating parts thereof will be supported and operated from their peripheries, in effect providing large centerless bearings, sealed against leakage or entry of air, water, or foreign materials, and providing large bearing surfaces for distributing the gun recoil forces to the airplane structure.

It is another object of this invention to provide a turret of the class described wherein a traversing shell is mounted in the airplane as a self-contained major unit, and in turn supports an elevation assembly which carries the gun and sighting mechanism as well as provides an observation shell or dome for the gunner; the arrangement materially contributing to the stiffness and shock resistance of the assembled turret and thereby assuring easy operation of the bearings therefor.

Other and further important objects of this invention will be apparent from the disclosures in the specification and the accompanying drawings.

This invention in its preferred form is illustrated in the drawings and hereinafter more fully described.

In the accompanying drawings I have disclosed a gun turret particularly adapted to use for aircraft armament, it being understood that modifications could be made to adapt my invention to other uses.

Figure I is a side elevation of an aircraft twin gun turret embodying the features of this invention, the top of the airplane fuselage being fragmentarily shown for reference purposes.

Figure II is an enlarged cross-section on the line II—II of Figure I showing the space available for the gunner, the seat and turret drive mechanism being omitted.

Figure III is an enlarged typical detail of the bearing races, corresponding to the lower right hand section of the vertical bearing in Figure II.

Figure IV is a perspective view of the traversing sub-assembly of the turret, which is supported in the fuselage for rotation about a vertical axis.

Figure V is a perspective view of the elevating sub-assembly of the turret, which is supported for rotation in the vertical rings of Figure IV, this view also including a diagrammatic showing of the driving gearing for elevational control of the turret.

Figure VI is an enlarged vertical sectional view of the main horizontal bearing.

As shown:

The specific embodiment of my invention chosen for illustrative purposes is intended to be used as a top rear turret in an airplane, so that a fuselage 10 has been fragmentarily indicated in Figure I, the fuselage having a circular well 11 to receive the turret, the well being secured to a horizontal mounting 12 forming fixed twin races 13 of a centerless ball bearing 14 that supports the complete turret for rotation about a vertical axis, hereinafter referred to as the traverse movement of the turret. Inner movable races 15 of the bearing support fixed outer races 16 of vertical ball bearings 17 within which movable races 18, supporting the central part of the turret, rotate about a horizontal axis, hereinafter referred to as the elevating movement of the turret. As indicated in the enlarged bearing section of Figure III, rubber-like seals 19 are carried by the stationary parts of the races or tracks 12 and 16 and bear against the movable races 15 and 18 to prevent entry of foreign matter such as dust and water, and the escape of lubricant or air in the case of a pressurized installation. Bearings of the character herein disclosed for supporting the traversing and elevating components form the subject of my application for patent, Serial No. 366,659, filed November 22, 1940.

The vertical races 16 are stationarily mounted relative to the traversing race 15 and are further supported by skirts 20 occupying the lower quadrants between the movable traversing race 15 and the outer races of the elevating races 16. The skirts 20 also serve to stiffen the vertically disposed races 16. The traversing sub-assembly of the turret, as indicated in Figure IV, is further tied together by a central enclosure 21 having transparent panels 22, and is preferably arranged for quick opening to form an emergency escape hatch for the gunner. The enclosure 21 extends between and is secured to the spaced elevating races 16.

A central column or pedestal 23 is supported from the floor 24 of the fuselage, the column having a seat 25 and foot bar 26 rotatable thereabout, and serves as a pivoted guide for housings 27 for gearing operating the elevating motion of the turret. As diagrammatically illustrated in Figure V, without the housing, the gearing comprises gear segments 28, associated with the elevating bearing races 18, and engaged by worms 29 driven in unison through bevel pinions 30 by a central shaft 31 which extends through the column 23 to driving mechanism (not shown) beneath the floor 24 of the fuselage. Traversing motions of the turret are provided by a worm 32 engaging a gear 33 forming part of the traverse bearing race 15.

The present invention is directed to the traversing and elevating arrangements of the turret, and for present purposes it is immaterial whether the turret is operated remotely, or by a gunner seated therein, as it will be evident that the novel construction of the present turret particularly lends itself to remote operation of a plurality of auxiliary turrets from one centrally located turret.

The elevating portion of the turret, shown in Figure V, may have disc-like partitions 34 mounted in the movable races 18. The upper parts of the partitions 34 preferably have transparent panels 35, while the lower parts carry outwardly bulged shells 37 providing spaces 36 for spent cartridges. Transverse partitions 38 close the upper ends of the spaces 36 and are positioned below the breech blocks 39 of machine guns 40 mounted outside the partitions 34. The guns 40 are suitably secured to the partitions 34. Replaceable ammunition containers 41 near the front of the central or elevating part of the turret may feed the cartridge belts through chutes 42 to the gun breeches, and spent cartridges can be discharged to the containers in the spaces 36 through chutes 43. The spaces outside the gun breeches and above the partition 38 can be conveniently enclosed in a readily removable streamlined shell 44.

The central enclosure 21 together with the races 16 and partitions 34 form a central cockpit for the gunner.

While forming no part of the present invention, a wide base binocular sight may have its objectives 45 mounted in line with and above the gunbarrels with its eye-pieces 46 brought together at a point convenient to the gunner's eye level and position. Such a gunsight has been disclosed and claimed in my previous application Serial No. 335,482, filed May 16, 1940, entitled "Gunsight."

In the operation of the turret of this invention the integration of the traverse and elevating movements is facilitated by the subdivision of the turret into traversing and elevating components, a combination of the two movements permitting accurate alignment of the sight and guns with a target anywhere in the field of fire. By mounting each component at its perimeter or periphery, the structures interbrace each other and assure a rigid gun mounting with a minimum of deflection and binding due to the recoil of heavy calibre guns, and the aircraft structure in the neighborhood of the turret need not be heavily reinforced to receive concentrated loads. The wide spacing of the twin guns assures that at least one unit will always be effective to shoot past intervening obstructions such as the empennage structure, an operation greatly facilitated by the use of my binocular wide base-line telescopic sight. Since the guns are separated so that they lie outside the sides of the gunner's compartment the latter need be only large enough for the gunner so that the turret as a whole can be much smaller than would be the case were it necessary to provide room for the guns as well as the gunner. In effect, the trunnion bearings of the guns are the elevation bearing races 16 forming centerless ball bearings approximately a yard in diameter, the large number of balls 17 distributing the recoil forces over a large area and permitting the use of heavy calibre guns in a compact turret having a greatly reduced air resistance at the high airplane speeds now contemplated.

By constructing the turret as separate traversing and elevating sub-assemblies supported from their peripheries, a more rigid, and hence more delicately controllable turret results.

It will thus be seen that the present invention provides a gun turret having manifold advantages over prior designs, and having described my invention in its preferred embodiment for aircraft, I desire to emphasize that many modifications may be resorted to, in a manner limited only by a just interpretation of the following claims.

I claim:

1. A circular gun turret having relatively movable components arranged for traversing and elevating movements, comprising a central segment, a peripheral bearing supporting said segment for rotation about a vertical axis, spaced vertical bearing rings supported by said peripheral bearing and defining the sides of said segment, a closure extending between the upper parts of said rings, said closure and said rings forming a gunner's cockpit, skirts covering the spaces between the peripheral bearing and the vertical rings below the level of the former, whereby to stiffen and support the latter, bearings supported in said bearing rings for rotation about a horizontal axis, and side closures in the planes of and carried by said bearings, said side closures being adapted to each support a gun and means adapted to rotate said side closures in synchronization for elevating the guns.

2. A circular gun turret having relatively movable components arranged for traversing and elevating movements, comprising a central segment, a peripheral bearing supporting said segment for rotation about a vertical axis, spaced vertical bearing rings supported by said peripheral bearing and defining the sides of said segment, a closure extending between the upper parts of said rings, said closure and said rings forming a gunner's cockpit, skirts covering the spaces between the peripheral bearing and the vertical rings below the level of the former, and supporting the latter from the former, bearings supported in said bearing rings for rotation about a horizontal axis, and side closures carried by and substantially within the planes of said bearings, said side closures being adapted to each support a gun, and means interconnecting said bearings for elevational movements as a unit.

3. A gun turret having relatively movable components arranged for traversing and elevating movements comprising a main segment, a circular bearing at the periphery of the segment for supporting the segment for rotation about a vertical axis, horizontally spaced vertical bearing rings having substantial lower portions received within the circular bearing, means for supporting the bearing rings on said circular bearing, bearings carried by said rings for rotation about a horizontal axis, side closures carried by the last named bearings each being adapted to support a gun, and means associated with said last named bearings for simultaneously rotating the side closures to elevate and depress the guns in unison.

ALFRED CORTE.